United States Patent [19]

Fagan

[11] Patent Number: 5,071,089
[45] Date of Patent: Dec. 10, 1991

[54] OFF WEIGHT LIFT WING FOR SKIERS AND THE LIKE

[76] Inventor: Robert D. Fagan, 80 Lake Rd., Greenlawn, N.Y. 11740

[21] Appl. No.: 557,660

[22] Filed: Jul. 25, 1990

[51] Int. Cl.⁵ .......................... B64C 31/02; A63C 5/11
[52] U.S. Cl. ........................................ 244/16; 280/810
[58] Field of Search ................ 244/900, 4 A, 901, 16; 280/810

[56] References Cited

U.S. PATENT DOCUMENTS

| | | | |
|---|---|---|---|
| 2,018,062 | 10/1935 | Hardt | 280/810 |
| 2,067,423 | 1/1937 | Sohn et al. | 244/16 |
| 2,181,326 | 11/1939 | Griffin | 244/16 |
| 3,047,302 | 7/1962 | Krylov | 280/810 |
| 3,083,933 | 4/1963 | Cella | 244/900 X |
| 3,700,191 | 10/1972 | Page | 244/16 |
| 3,863,868 | 2/1975 | Oberle | 244/16 |
| 3,924,870 | 12/1975 | Spivack et al. | 280/810 |
| 4,417,707 | 11/1983 | Leong | 244/900 X |

Primary Examiner—Joseph F. Peters, Jr.
Assistant Examiner—Carla Mattix
Attorney, Agent, or Firm—Richard L. Miller

[57] ABSTRACT

An off weight lift wing for a skier and the like is provided and consists of a pair of airfoils each supported on an opposite end of a crossbar which extends across the top of a frame with a harness that secures the frame to the back of the skier. The lift wing will create a balanced lift to the upper body of the skier and allow more agile body movement when skiing, as well as extending the length of a ski jump.

4 Claims, 1 Drawing Sheet

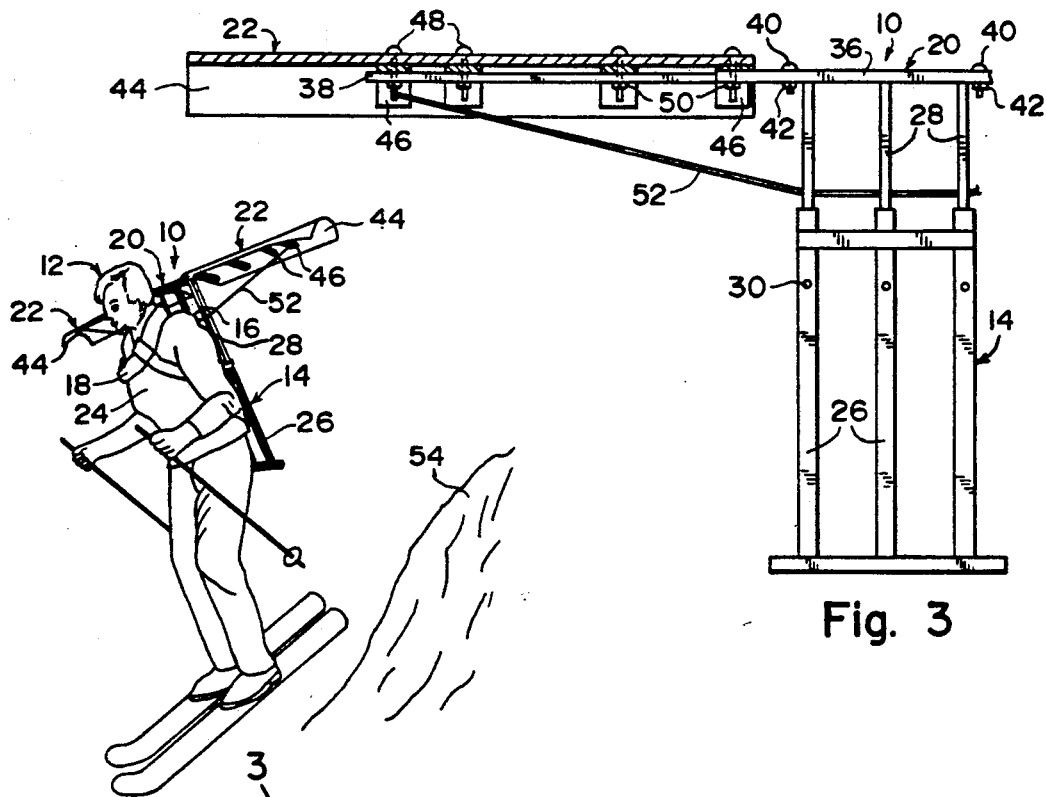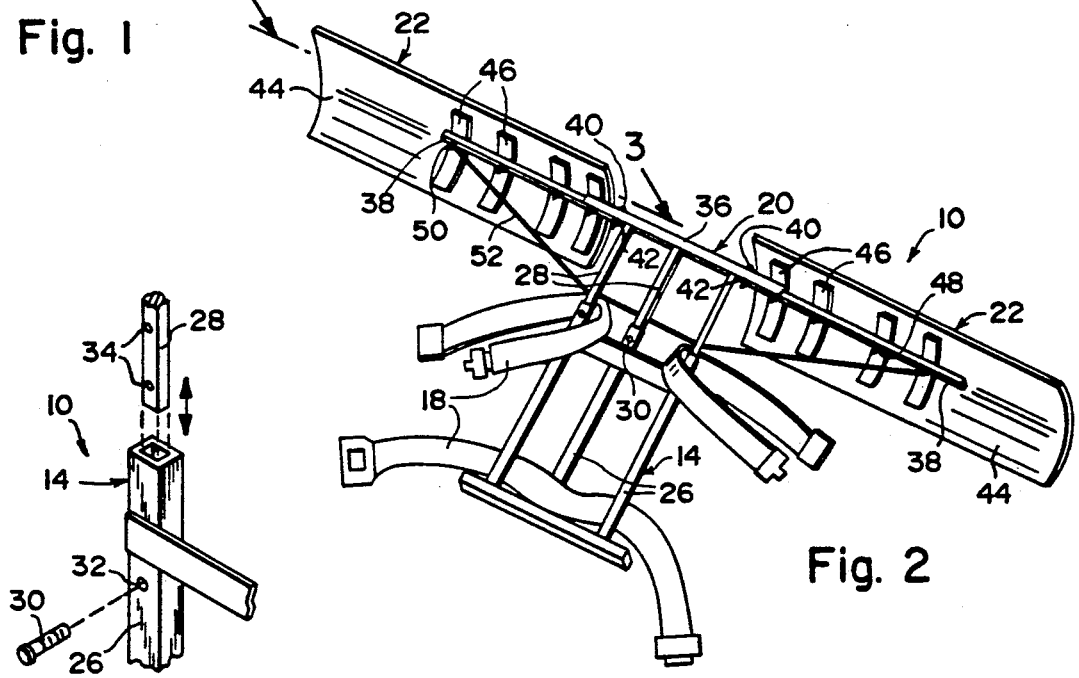

OFF WEIGHT LIFT WING FOR SKIERS AND THE LIKE

BACKGROUND OF THE INVENTION

The instant invention relates generally to hang gliders and more specifically it relates to an off weight lift wing for skiers and the like.

Numerous hang gliders have been provided in the prior art that are adapted to be devices that resemble kites from which harnessed riders hang while gliding through the atmosphere from heights. While these units may be suitable for the particular purpose to which they address, they would not be suitable for the purpose of the present invention as hereafter described.

SUMMARY OF THE INVENTION

A primary object of the present invention is to provide an off weight lift wing for skiers and the like that will overcome the shortcomings of the prior art devices.

Another object is to provide an off weight lift wing for skiers that will lift the upper body of a skier and allow more agile body movement when skiing at a slow speed.

An additional object is to provide an off weight lift wing for skiers and the like that will create a balanced lift to the skier so as to extend the length of a jump when skiing.

A further object is to provide an off weight lift wing for skiers and the like that is simple and easy to use.

A still further object is to provide an off weight lift wing for skiers and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view illustrating the instant invention in use strapped upon a skier;

FIG. 2 is a perspective view of the instant invention per se;

FIG. 3 is a diagrammatic cross sectional view with parts broken away, of the instant invention taken along line 3—3 in FIG. 2; and FIG. 4 is a diagrammatic perspective view illustrating an adjustable portion of the instant invention, and showing the construction details thereof.

DETAILED DESCRIPTION OF THE PREFERRED EMBODIMENTS

Turning now descriptively to the drawings, in which like reference characters denote like elements throughout the several views, the Figures illustrate an off weight lift wing 10 for a skier 12 and the like consisting of a frame 14 to fit against a back 16 of the skier 12. A harness 18 is for securing the frame 14 to the back of the skier 12. A crossbar 20 extends across the top of the frame 14 while a pair of airfoils 22 are each supported on an opposite end of the crossbar 20. The lift wing 10 will create a balanced lift of the upper body 24 of the skier 12 and allow more agile body movement when skiing as well as to extend the length of a ski jump.

The frame 14 is adjustable and includes a plurality of hollow legs 26 and a plurality of adjustable legs 28. Each adjustable leg 28 telescopically fits into one hollow leg 26. A set screw 30 is for locking each adjustable leg 28 within each hollow leg 26 by extending through a hole 32 in the hollow leg 26 and into one of multiple holes 34 in the adjustable leg 28, to compensate for different sized backs 16 of skiers 12. It is to be noted that this adjustment also allows the user to change the stability of his skiing stance. When setting the wing in a high position a more stabler skiing characteristic is achieved than when the wing is set in a low position.

The cross bar 20 includes a hollow stationary arm 36 affixed transversely to the adjustable legs 28 and a pair of removable arms 38. Each removable arm 38 telescopically fits into one end of the stationary arm 36 and affixed thereto by a bolt 40 and nut 42.

Each airfoil 22 includes a curved wing blade 44 and a plurality of curved cross ribs 46 affixed in a spaced apart relationship to the underside of the wing blade 44 which are in turn mounted onto the crossbar 20 by bolts 48 and nuts 50. A rigging cable 52 extends between the distal ends of the crossbar 20 and through the adjustable legs 28 of the frame 14 so as to stabilize the wing blades 44, and add additional strength to the structure and prevent failure of the stationary arm 36 and associated structure due to high bending moment forces which would otherwise be present in the structure were this cable 52 not present.

When a skier 12 travels such as down a hill 54, the wing blades 44 of the lift wing 10 will provide a lifting action to raise the skier 12 slightly into the air creating a general float effect in an airborne state.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An off weight lift wing for a skier and the like comprising:
   a) a frame to fit against a back of the skier, wherein said frame is adjustable and includes:
      i) a plurality of hollow legs;
      ii) a plurality of adjustable legs, each telescopically fits into one of said hollow legs; and
      iii) a plurality of set screws for locking said adjustable legs within said hollow legs to compensate for skiing stability characteristics and different sized back of skiers;
   b) a harness for securing said frame to the back of the skier;
   c) a crossbar extending across the top of said frame; and
   d) a pair of airfoils, each supported extending horizontally on an opposite end of said crossbar whereby skiing movement will create a balance lift to the upper body of the skier and allow the lower body movement when skiing as well as to extend the length of a ski jump.

2. An off weight lift wing as recited in claim 1, wherein said cross bar includes:
   a) a hollow stationary arm affixed transversely to the adjustable legs; and
   b) a pair of removable arms, each telescopically fits into one end of said stationary arm and affixed thereto.

3. An off weight lift wing as recited in claim 2, wherein each said airfoil includes:
   a) a curved wing blade; and
   b) a plurality of curved cross ribs affixed in a spaced apart relationship to the underside of said wing blade which are in turn mounted onto said crossbar.

4. An off weight lift wing as recited in claim 3, further including a rigging cable extending between the distal ends of said crossbar and through said adjustable legs of said frame so as to stabilize said wing blades and prevent structural failure due to bending moment forces.

* * * * *